US007080812B2

(12) United States Patent
Wadsworth et al.

(10) Patent No.: US 7,080,812 B2
(45) Date of Patent: Jul. 25, 2006

(54) HOLDING DEVICE FOR HOLDING A PORTABLE OBJECT, AND METHOD OF MANUFACTURING SAME

(75) Inventors: John Wadsworth, Los Angeles, CA (US); Oliver Duncan Seil, Pasadena, CA (US)

(73) Assignee: Belkin Corporation, Compton, CA (US)

( * ) Notice: Subject to any disclaimer, the term of this patent is extended or adjusted under 35 U.S.C. 154(b) by 43 days.

(21) Appl. No.: 10/759,326

(22) Filed: Jan. 17, 2004

(65) Prior Publication Data

US 2005/0156088 A1     Jul. 21, 2005

(51) Int. Cl.
*H04M 1/00*     (2006.01)

(52) U.S. Cl. ............... 248/316.6; 248/316.1; 248/316.4; 379/455; 379/446

(58) Field of Classification Search ............ 248/316.1, 248/316.3, 316.6, 552; 379/454, 455, 446, 379/316.5, 229.13, 229.23

See application file for complete search history.

(56) References Cited

U.S. PATENT DOCUMENTS

| | | | | |
|---|---|---|---|---|
| 5,457,745 A * | 10/1995 | Wang | ...................... | 379/454 |
| 5,694,468 A * | 12/1997 | Hsu | ...................... | 379/446 |
| 5,788,202 A * | 8/1998 | Richter | ...................... | 248/316.4 |
| 5,836,563 A * | 11/1998 | Hsin-Yung | ...................... | 248/316.4 |
| 5,903,645 A * | 5/1999 | Tsay | ...................... | 379/455 |
| 5,947,359 A * | 9/1999 | Yoshie | ...................... | 224/570 |
| 6,183,105 B1 * | 2/2001 | Parker | ...................... | 362/183 |
| 6,229,891 B1 * | 5/2001 | Chen | ...................... | 379/446 |
| 6,229,893 B1 * | 5/2001 | Chen | ...................... | 379/454 |
| 6,785,567 B1 * | 8/2004 | Kato | ...................... | 455/575.9 |

\* cited by examiner

*Primary Examiner*—Ramón O. Ramirez
*Assistant Examiner*—Steven Marsh
(74) *Attorney, Agent, or Firm*—Bryan Cave LLP

(57) ABSTRACT

A holding device for holding a portable object includes a support platform (210), a first arm (120) coupled to the support platform, a second arm (130) coupled to the support platform, a biasing member (140) located between the first and second arms, a locking mechanism (150) capable of maintaining the first arm and the second arm in any one of a plurality of discrete positions with respect to each other, and a release button (260) capable of releasing the locking mechanism adjacent to the support platform. The biasing member is capable of urging at least a portion of the first arm and at least a portion of the second arm toward each other.

26 Claims, 5 Drawing Sheets

500

510 — Provide a support platform having a first arm and a second arm coupled thereto 520 — Provide a biasing member capable of urging at least a portion of the first arm and at least a portion of the second arm toward each other 530 — Provide a locking mechanism capable of maintaining the first arm and the second arm in any one of a plurality of discrete positions with respect to each other 540 — Provide a release button adjacent to the support platform, the release button capable of releasing the locking mechanism

FIG.5

HOLDING DEVICE FOR HOLDING A PORTABLE OBJECT, AND METHOD OF MANUFACTURING SAME

FIELD OF THE INVENTION

This invention relates generally to holding devices, and relates more particularly to holding devices for portable electronic devices.

BACKGROUND OF THE INVENTION

Electronic devices small enough to be used outside of a home or office environment have existed for many years. While early versions of such electronic devices may have been rather cumbersome, more modern versions are often so small and light that they can easily be carried in a pocket or purse, encouraging the use of cellular telephones, personal digital assistants (PDAs), and similar electronic devices from almost any location. It is very common, for example, for a person to use a cell phone or a PDA while operating a vehicle. Many holders exist that are designed to hold or support an electronic device inside a vehicle and within reach of the driver. The existing holders, however, require a user to place the device to be held in or on the holder and then to manipulate various parts of the holder in order to secure the device in the holder. For example, in many existing holders, sliding arms must be moved toward each other until the user feels that the device is secure. Accordingly, there exists a need for a holding device for holding a portable object, such as a portable electronic device, that automatically secures the portable object in the holding device when the user places the portable object in the holding device.

BRIEF DESCRIPTION OF THE DRAWINGS

The invention will be better understood from a reading of the following detailed description, taken in conjunction with the accompanying figures in the drawings in which:

FIG. 5 is a flowchart illustrating a method of manufacturing a holding device according to an embodiment of the invention.

Figure 1:
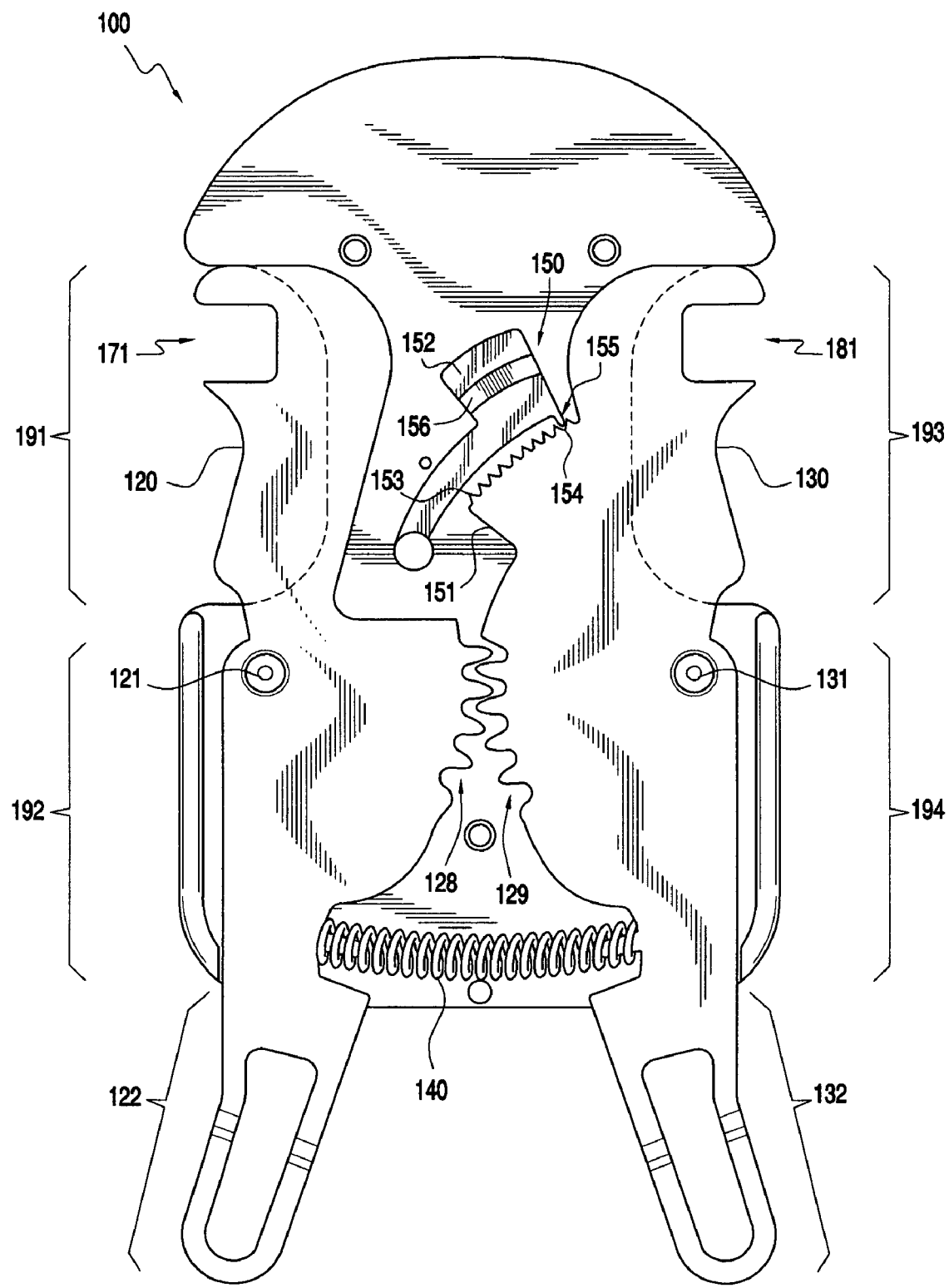
FIG. 1 is a cutaway view of a holding device according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a holding device for holding a portable object comprises: a support platform; a first arm coupled to the support platform; a second arm coupled to the support platform; a biasing member located between the first and second arms; a locking mechanism capable of maintaining the first arm and the second arm in any one of a plurality of discrete positions with respect to each other; and a release button adjacent to the support platform, the release button capable of releasing the locking mechanism. The biasing member is capable of urging at least a portion of the first arm and at least a portion of the second arm toward each other.

Figure 2:
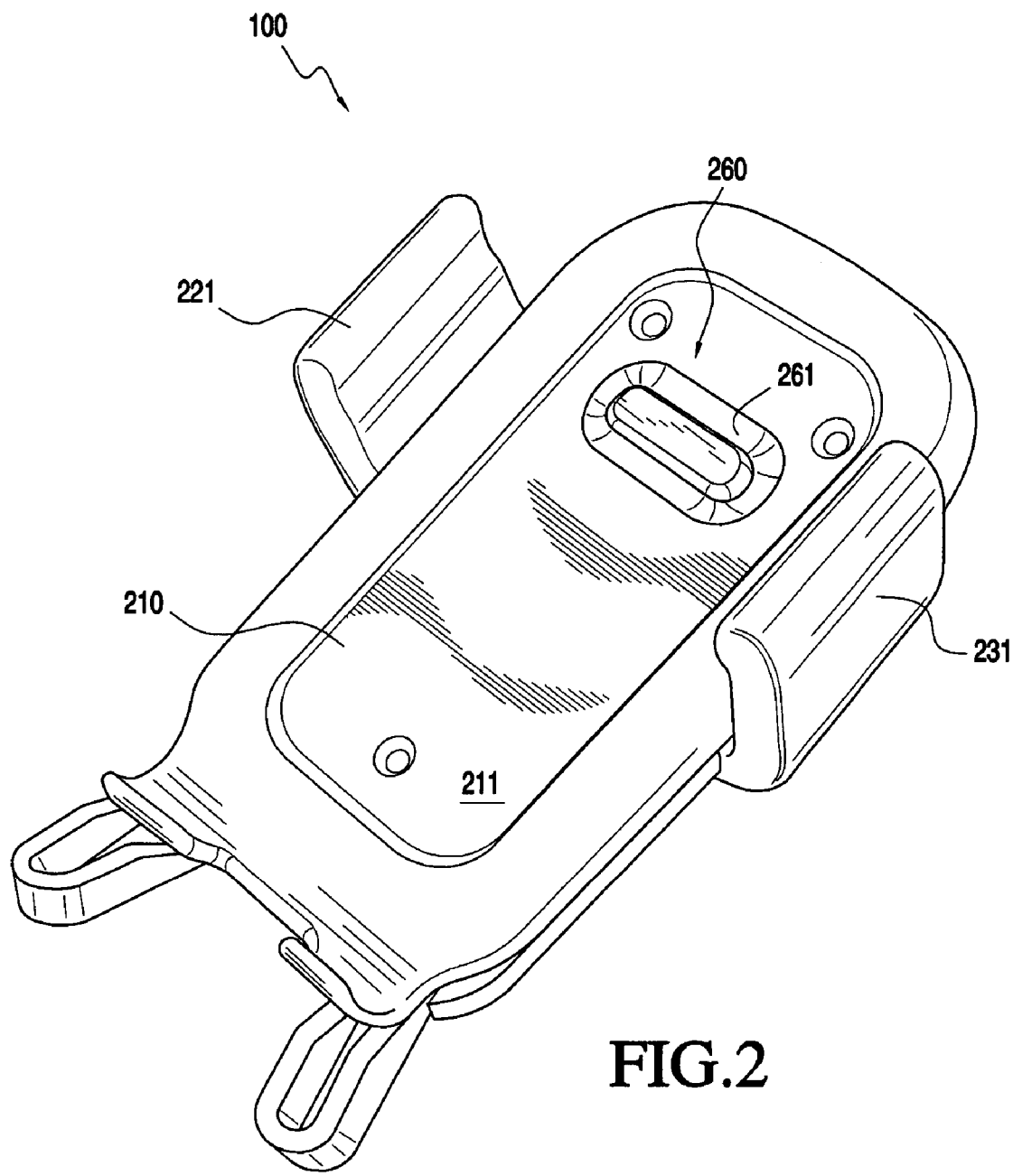
FIG. 2 is an isometric view of the holding device of FIG. 1 according to an embodiment of the invention.

FIG. 1 is a cutaway view of a holding device 100 according to an embodiment of the invention. FIG. 2 is an isometric view of holding device 100 according to an embodiment of the invention. As illustrated in FIGS. 1 and 2, holding device 100 comprises a support platform 210, an arm or lever 120 coupled to support platform 210, an arm or lever 130 coupled to support platform 210, a biasing member 140 located between arm 120 and arm 130, a locking mechanism 150, and a release button 260 adjacent to support platform 210. Arm 120 has a portion 191 and a portion 192. Arm 130 has a portion 193 and a portion 194. Hereafter in this description, the word "arm" should be understood to include the meaning "lever," and vice versa.

Figure 3:
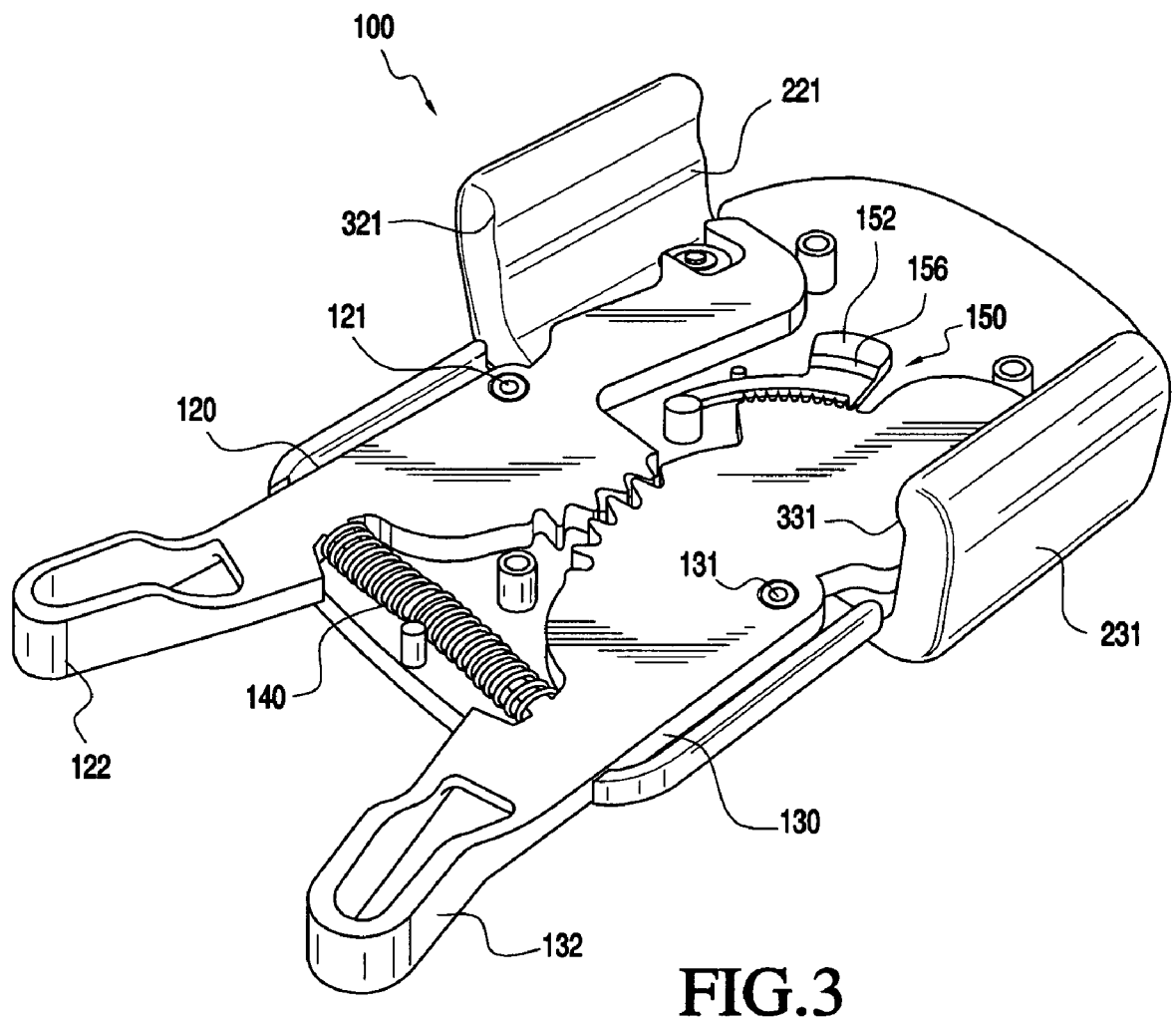
FIG. 3 is a different isometric view of the holding device of FIG. 1 according to an embodiment of the invention.

FIG. 3 is a different isometric view of holding device 100 according to an embodiment of the invention. Referring to FIG. 3, and still to FIGS. 1 and 2, holding device 100 further comprises a grip 221 rigidly coupled to portion 191 of arm 120 and a grip 231 rigidly coupled to portion 193 of arm 130. Grip 221 can be coupled to arm 120 at region 171, and grip 231 can be coupled to arm 130 at region 181. In one embodiment, grip 221 comprises an overhang 321 and grip 231 comprises an overhang 331 capable of overlying an upper or top surface of a portable object being held in holding device 100 so as to increase the security of the grip provided. Grips 221 and 231 can also be formed from a material having a coefficient of friction sufficiently high to reduce or prevent slipping between grips 221 and 231 and the portable object being held in holding device 100. In the same or another embodiment, grips 221 and 231 comprise a substantially rigid core. As an example, the core may comprise acrylonitrile butadiene styrene (ABS), a polycarbonate material, or the like. In the same or another embodiment, grips 221 and 231 further comprise a flexible material such as a thermoplastic elastomer, an elastomeric pad, or the like, located adjacent to the core. As used herein, the phrase "adjacent to" includes "exterior to," as in the case where the flexible material forms a covering, shell, or overmold completely or partially surrounding the core.

Locking mechanism 150 is capable of maintaining arm 120 and arm 130 in any one of a plurality of discrete positions with respect to each other. Release button 260 is capable of releasing locking mechanism 150. Biasing member 140, which in the illustrated embodiment is a spring located between portions 192 and 194, is capable of urging at least a portion of arm 120 and at least a portion of arm 130 toward each other. Locking mechanism 150, release button 260, and biasing member 140 will each be further described below.

Arm 120 further comprises an arm axis, or axis of rotation, 121 and a handle 122, and arm 130 further comprises an arm axis, or axis of rotation, 131 and a handle 132. Arm axis 121 is located between portions 191 and 192, and arm axis 131 is located between portions 193 and 194.

Handle 122 is rigidly coupled to portion 192 of arm 120, and handle 132 is rigidly coupled to portion 194 arm 130. Arm axis 121 and arm axis 131 are substantially perpendicular to support platform 210. Arm 120 is capable of rotating about arm axis 121, and arm 130 is capable of rotating about arm axis 131. As an example, during use of holding device 100, a force may be applied to handle 122 and an opposing force may be applied to handle 132. Such forces may be generated, for example, by a person's finger and thumb applied respectively to one or the other of handles 122 and 132. Such application of opposing forces to handles 122 and 132 tends to override the natural bias of biasing member 140 thus moving handles 122 and 132 toward each other while moving regions 171 and 181 away from each other.

Referring still to FIGS. 1 and 2, support platform 210 has a surface 211. In the illustrated embodiment, release button 260 is located at and protrudes from surface 211 of support platform 210 such that release button 260 may be actuated simply by the application of a force, substantially perpendicular to surface 211, applied to the portable object when the portable object is supported by surface 211 and located between grips 221 and 231. In one embodiment, when release button 260 is actuated, a portion of release button 260 interacts with a portion of locking mechanism 150 so as to release locking mechanism 150 and allow arms 120 and 130 to move freely with respect to each other. As a particular example, release button 260 can comprise a boss (not shown) terminating in a rounded surface capable of making contact with an angled surface 156 of pawl 152. Actuation of release button 260 causes the boss to force pawl 152 out of the way of ratchet 151.

In the same or another embodiment, holding device 100 can further comprise a force damping mechanism, as known in the art, to reduce, slow down, or otherwise alter the biasing force of biasing member 140, thus allowing for smoother operation of holding device 100. In the same or another embodiment, release button 260 is covered by a pad 261. Pad 261 functions to reduce the likelihood that release button 260 will be actuated accidentally, and also to improve the appearance of holding device 100 by hiding release button 260. In one embodiment, pad 261 comprises silicon or a silicon based material.

In one embodiment, locking mechanism 150 comprises a ratchet 151 and a pawl 152 capable of engaging ratchet 151. In the illustrated embodiment, ratchet 151 is integral with arm 130. In a different embodiment, ratchet 151 could be integral with arm 120 instead of arm 130, or could be separate both from arm 120 and from arm 130. As illustrated in FIG. 1, ratchet 151 comprises a plurality of teeth 153 and a plurality of indentations 154. In one embodiment, each tooth 153 is substantially uniform in size and shape such that the separation between adjacent ones of plurality of indentations 154 is substantially uniform. Pawl 152 is capable of engaging at least one of plurality of indentations 154. In one embodiment, pawl 152 comprises an end 155 sized to fit within one or more of plurality of indentations 154. As an example, engagement of pawl 152 with ratchet 151 can be accomplished when end 155 is within one of plurality of indentations 154. During such engagement of pawl 152 with ratchet 151, arm 120 and arm 130 are held in a fixed position with respect to each other. Actuation of release button 260 and/or the application of force to handles 122 and 132 can disengage pawl 152 and ratchet 151. After disengagement of pawl 152 and ratchet 151, pawl 152 is free to engage with the same one of plurality of indentations 152, with another of plurality of indentations 152, or to remain disengaged from ratchet 151 altogether.

Referring still to FIGS. 1 and 2, in one embodiment, arm 120 further comprises a plurality of teeth 128 at portion 192, and arm 130 further comprises a plurality of teeth 129 at portion 194. Plurality of teeth 128 interact with plurality of teeth 129 such that a movement of one of arms 120 and 130 causes a movement in the other of arms 120 and 130.

Figure 4:
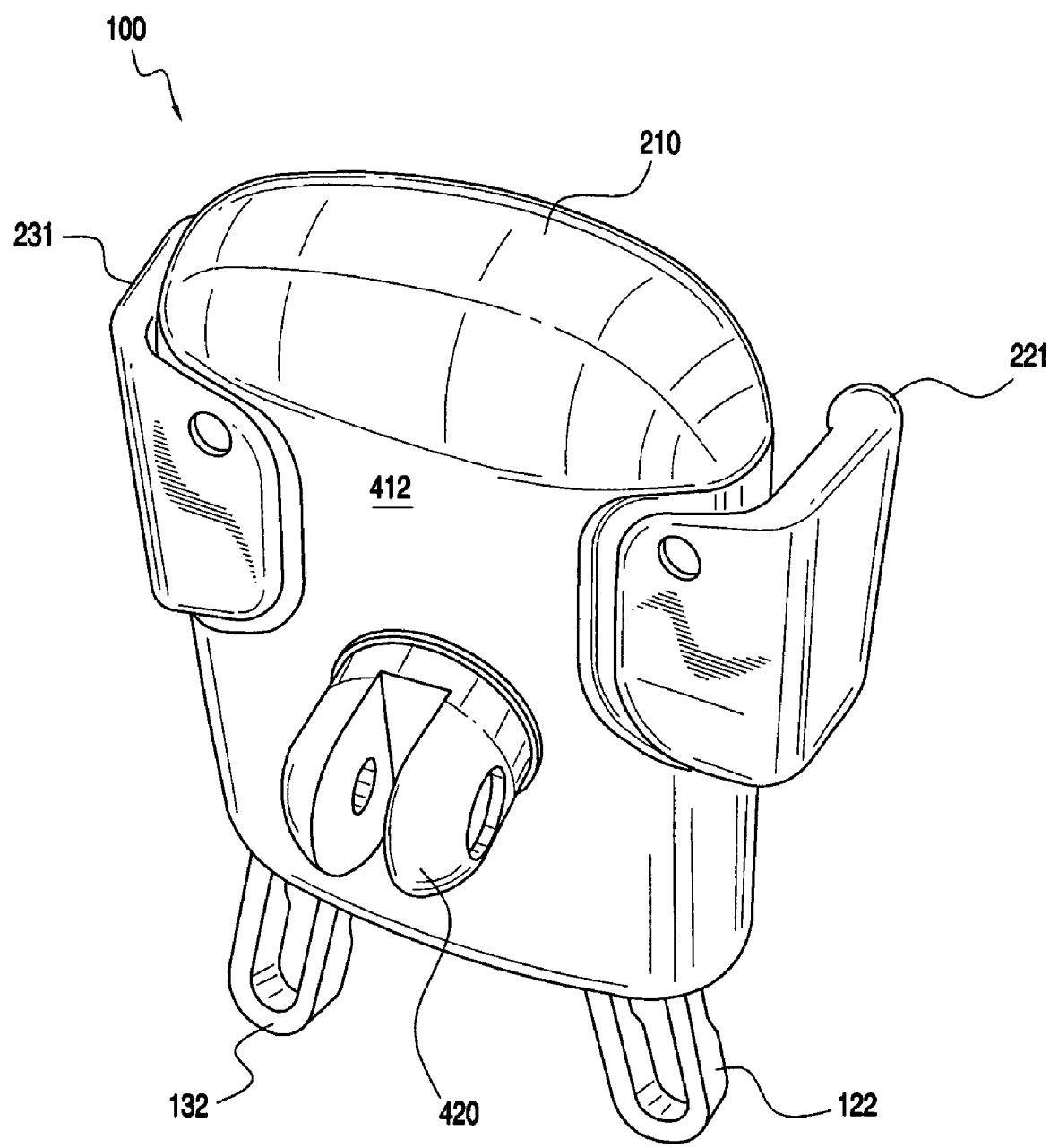
FIG. 4 is an isometric view of the holding device of FIG. 1 according to an embodiment of the invention.

FIG. 4 is an isometric view of holding device 100 according to an embodiment of the invention. As illustrated in FIG. 4, support platform 210 of holding device 100 comprises a surface 412 substantially opposite surface 211. In one embodiment, surface 412 is coupled to a mounting mechanism 420. As an example, mounting mechanism 420 can be capable of attaching to a surface or other portion of a vehicle, or to a secondary apparatus capable of attaching to a surface or other portion of a vehicle, such that the portable object held by holding device 100 is accessible to and usable by a driver or other occupant of the vehicle.

FIG. 5 is a flowchart illustrating a method 500 of manufacturing a holding device according to an embodiment of the invention. A step 510 of method 500 is to provide a support platform having a first arm and a second arm coupled thereto. As an example, the support platform can be similar to support platform 210, first shown in FIG. 2. As another example, the first arm can be similar to arm 120, and the second arm can be similar to arm 130, both of which were first shown in FIG. 1. In one embodiment, step 510 or another step can further comprise providing a first grip coupled to the first arm and a second grip coupled to the second arm. As an example, the first and second grips can be similar to, respectively, grips 221 and 231, first shown in FIG. 2. In the same or another embodiment, step 510 or another step can further comprise providing the first arm to be rotatable about a first arm axis and providing the second arm to be rotatable about a second arm axis, where the first arm axis and the second arm axis are substantially perpendicular to the support platform.

A step 520 of method 500 is to provide a biasing member capable of urging at least a portion of the first arm and at least a portion of the second arm toward each other. As an example, the biasing member can be similar to biasing member 140, first shown in FIG. 1.

A step 530 of method 500 is to provide a locking mechanism capable of maintaining the first arm and the second arm in any one of a plurality of discrete positions with respect to each other. As an example, the locking mechanism can be similar to locking mechanism 150, first shown in FIG. 1. In one embodiment, step 530 or another step can further comprise providing the locking mechanism to comprise a ratchet and a pawl. As an example, the ratchet can be similar to ratchet 151, first shown in FIG. 1, and the pawl can be similar to pawl 152, also first shown in FIG. 1.

A step 540 of method 500 is to provide a release button adjacent to the support platform, the release button capable of releasing the locking mechanism. As an example, the release button can be similar to release button 260, first shown in FIG. 2.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the holding device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A holding device for holding a portable object, the holding device comprising:
    a support platform;
    a first arm coupled to the support platform;
    a second arm coupled to the support platform;
    a biasing member located between the first and second arms;
    a locking mechanism capable of maintaining the first arm and the second arm in any one of a plurality of discrete positions with respect to each other; and
    a release button adjacent to the support platform, the release button capable of releasing the locking mechanism,
    wherein:
        the biasing member is capable of urging at least a portion of the first arm and at least a portion of the second arm toward each other;
        the first arm comprises a first arm axis;
        the second arm comprises a second arm axis;
        the first arm axis and the second arm axis are substantially perpendicular to the support platform;
        the first arm is capable of rotating about the first arm axis; and
        the second arm is capable of rotating about the second arm axis.

2. The holding device of claim 1 further comprising:
    a first grip coupled to the first arm; and
    a second grip coupled to the second arm.

3. The holding device of claim 1 wherein:
    the biasing member comprises a spring.

4. The holding device of claim 1 wherein:
    the support platform comprises an upper surface and a lower surface substantially opposite the upper surface; and
    the release button is located at the upper surface of the support platform.

5. The holding device of claim 4 wherein:
    the release button protrudes from the support platform.

6. The holding device of claim 4 wherein:
    the lower surface of the support platform is coupled to a mounting mechanism.

7. The holding device of claim 1 wherein:
    the locking mechanism comprises:
        a ratchet; and
        a pawl capable of engaging the ratchet.

8. The holding device of claim 7 wherein:
    the ratchet is integral with one of the first and second arms.

9. The holding device of claim 7 wherein:
    the ratchet comprises a plurality of teeth and a plurality of indentations;
    the pawl is capable of engaging at least one of the plurality of indentations; and
    the first arm and the second arm are held in a fixed position with respect to each other when the pawl is engaged with one of the plurality of indentations.

10. A holding device for holding a portable object, the holding device comprising:
    a support platform;
    a first arm coupled to the support platform;
    a second arm coupled to the support platform;
    a biasing member located between the first and second arms;
    a locking mechanism capable of maintaining the first arm and the second arm in any one of a plurality of discrete positions with respect to each other; and
    a release button adjacent to the support platform, the release button capable of releasing the locking mechanism,
    wherein:
        the biasing member is capable of urging at least a portion of the first arm and at least a portion of the second arm toward each other;
        the first arm further comprises a first plurality of teeth;
        the second arm further comprises a second plurality of teeth; and
        the first plurality of teeth interacts with the second plurality of teeth such that a movement of one of the first and second arms causes a movement in the other of the first and second arms.

11. The holding device of claim 1 further comprising:
    a pad over the release button.

12. The holding device of claim 1 wherein:
    the first grip and the second grip comprise:
        a substantially rigid core; and
        a flexible material located adjacent to the core.

13. The holding device of claim 12 wherein:
the core is formed from a rigid plastic material; and
the flexible material comprises a thermoplastic elastomer.

14. A holding device for holding a portable object, the holding device comprising:
   a support platform having an upper surface for supporting the portable object and a lower surface substantially opposite the upper surface, the upper surface having a release button thereon;
   a first lever coupled to the support platform;
   a second lever coupled to the support platform;
   a first grip coupled to a first portion of the first lever;
   a second grip coupled to a first portion of the second lever;
   a first handle coupled to a second portion of the first lever;
   a second handle coupled to a second portion of the second lever;
   a spring coupled between second portions of the first and second levers; and
   a locking mechanism capable of maintaining the first lever and the second lever in any one of a plurality of discrete positions with respect to each other,
   wherein:
      the spring is capable of urging the first grip and the second grip toward each other;
      the release button is capable of being activated by the application of a force to the portable object when the portable object is supported by the upper surface and located between the first and second grips;
      the release button is capable of releasing the locking mechanism;
      the first arm comprises a first axis of rotation located between the first and second portions of the first arm;
      the second arm comprises a second axis of rotation located between the first and second portions of the second arm;
      the first arm axis and the second arm axis are substantially perpendicular to the upper surface of the support platform;
      the first arm is capable of rotating about the first arm axis: and
      the second arm is capable of rotating about the second arm axis.

15. The holding device of claim 14 wherein:
the release button protrudes from the support platform.

16. The holding device of claim 14 wherein:
the lower surface of the support platform is coupled to a mounting mechanism.

17. The holding device of claim 14 wherein:
the locking mechanism comprises:
   a ratchet; and
   a pawl capable of engaging the ratchet.

18. The holding device of claim 17 wherein:
the ratchet is integral with one of the first and second arms.

19. The holding device of claim 18 wherein:
the ratchet comprises a plurality of teeth and a plurality of indentations;
the pawl is capable of engaging at least one of the plurality of indentations; and
the first arm and the second arm are held in a fixed position with respect to each other when the pawl is engaged with one of the plurality of indentations.

20. A holding device for holding a portable object, the holding device comprising:
   a support platform having an upper surface for supporting the portable object and a lower surface substantially opposite the upper surface, the upper surface having a release button thereon;
   a first lever coupled to the support platform;
   a second lever coupled to the support platform;
   a first grip coupled to a first portion of the first lever;
   a second grip coupled to a first portion of the second lever;
   a first handle coupled to a second portion of the first lever;
   a second handle coupled to a second portion of the second lever;
   a spring coupled between second portions of the first and second levers; and
   a locking mechanism capable of maintaining the first lever and the second lever in any one of a plurality of discrete positions with respect to each other,
   wherein:
      the spring is capable of urging the first grip and the second grip toward each other;
      the release button is capable of being activated by the application of a force to the portable object when the portable object is supported by the upper surface and located between the first and second grips;
      the release button is capable of releasing the locking mechanism;
      the locking mechanism comprises;
         a ratchet; and
         a pawl capable of engaging the ratchet;
      the ratchet is integral with one of the first and second arms;
      the ratchet comprises a plurality of teeth and a plurality of indentations;
      the pawl is capable of engaging at least one of the plurality of indentations;
      the first arm and the second arm are held in a fixed position with respect to each other when the pawl is engaged with one of the plurality of indentations;
      the first arm further comprises a first plurality of teeth at the second portion of the first arm;
      the second arm further comprises a second plurality of teeth at the second portion of the second arm; and
      the first plurality of teeth interacts with the second plurality of teeth such that a movement of one of the first and second arms causes a movement in the other of the first and second arms.

21. The holding device of claim 14 further comprising:
a pad over the release button.

22. The holding device of claim 21 wherein:
the first grip and the second grip comprise:
   a substantially rigid core; and
   a flexible material located adjacent to the core.

23. The holding device of claim 22 wherein:
the core is formed from a rigid plastic material; and
the flexible material comprises a thermoplastic elastomer.

24. A method of manufacturing a holding device for a portable object, the method comprising:
   providing a support platform having a first arm and a second arm coupled thereto;
   providing a biasing member capable of urging at least a portion of the first arm and at least a portion of the second arm toward each other, the biasing member located between the first arm and the second arm;
   providing a locking mechanism capable of maintaining the first arm and the second arm in any one of a plurality of discrete positions with respect to each other;

providing a release button adjacent to the support platform, the release button capable of releasing the locking mechanism;
providing the first arm to be rotatable about a first arm axis; and
providing the second arm to be rotatable about a second arm axis,
wherein:
the first arm axis and the second arm axis are substantially perpendicular to the support platform.

25. The method of claim 24 further comprising:
providing a first grip coupled to the first arm; and
providing a second grip coupled to the second arm.

26. The method of claim 24 further comprising:
providing the locking mechanism to comprise:
a ratchet; and
a pawl capable of engaging the ratchet.

* * * * *